United States Patent [19]
Phillips

[11] 3,831,866
[45] Aug. 27, 1974

[54] METHOD AND APPARATUS FOR SHREDDING CHEESE

[75] Inventor: Duane Phillips, Oxford, Wis.
[73] Assignee: Armour and Company, Chicago, Ill.
[22] Filed: Nov. 18, 1971
[21] Appl. No.: 200,099

[52] U.S. Cl.................... 241/63, 83/212.1, 241/94
[51] Int. Cl.............................................. B02c 23/04
[58] Field of Search ............ 241/30, 94, 283, 262; 53/123; 221/251; 83/733, 717, 167, 212.1, 307.2, 703, 356, 464, 739, 241, 27, 34, 63, 273.1

[56] References Cited
UNITED STATES PATENTS

| | | | |
|---|---|---|---|
| 972,649 | 10/1910 | Rose | 221/251 |
| 1,330,639 | 2/1920 | Leumann | 221/251 |
| 1,969,004 | 8/1934 | Hartman | 53/123 |
| 2,480,736 | 8/1949 | Hysmith | 241/283 X |
| 3,104,835 | 9/1963 | Weber | 241/94 |
| 3,543,475 | 12/1970 | Moon | 53/123 X |
| 3,776,073 | 12/1973 | Runge | 83/47 |

FOREIGN PATENTS OR APPLICATIONS

| | | | |
|---|---|---|---|
| 314,409 | 9/1919 | Germany | 241/94 |

*Primary Examiner*—Roy Lake
*Assistant Examiner*—E. F. Desmond
*Attorney, Agent, or Firm*—Frank T. Barber; Carl C. Batz

[57] ABSTRACT

A method and apparatus for shredding blocks of cheese to fill individual packages each with a predetermined amount of shredded cheese. In one embodiment the apparatus includes a hopper device for holding a plurality of blocks of cheese in stacked relationship, fluid driven reciprocating mechanism for shredding cheese from the lowermost of these blocks, fluid driven mechanism for pressing the lowermost block in the stack against the reciprocating shredding mechanism with a substantially constant pressure, fluid control mechanism for permitting a next higher block of cheese to fall into place for shredding when the first block being shredded has been expended, and a fluid operated counting device which stops the movement of the reciprocating mechanism when a predetermined number of strokes has been had.

11 Claims, 10 Drawing Figures

PATENTED AUG 27 1974 3,831,866

METHOD AND APPARATUS FOR SHREDDING CHEESE

SUMMARY

This invention relates to a method and machine for shredding cheese and more particularly to a process and apparatus for shredding a predetermined amount of cheese from a block of cheese and placing this amount in an individual package.

BACKGROUND

Individual packages of shredded cheese have heretofore beenprepared by hand shredding blocks of cheese to obtain a mass of shredded cheese, then placing bits of the shredded cheese into a package by hand while weighing the cheese to determine when the desired amount has been placed in the package.

It would be of great value to have apparatus which would automatically shred the cheese from the blocks and fill the individual packages with the desired amount, and it is an object of the present invention to provide such a machine and to devise methods of operation and procedure which will accomplish this result. Other advantages of the invention will be apparent as this specification proceeds.

The cheese blocks to which I refer are those commonly prepared at the cheese plant and customarily these blocks are about 4 inches square in cross section and about 12 inches long, and weigh about 10 pounds but, of course, could be of other sizes and dimensions. My invention is addressed particularly to the shredding of such blocks of cheese and placing the shreddings into packages.

DRAWINGS

One embodiment of the invention is illustrated in the accompanying drawings in which.

DETAILED DESCRIPTION

Figure 1:
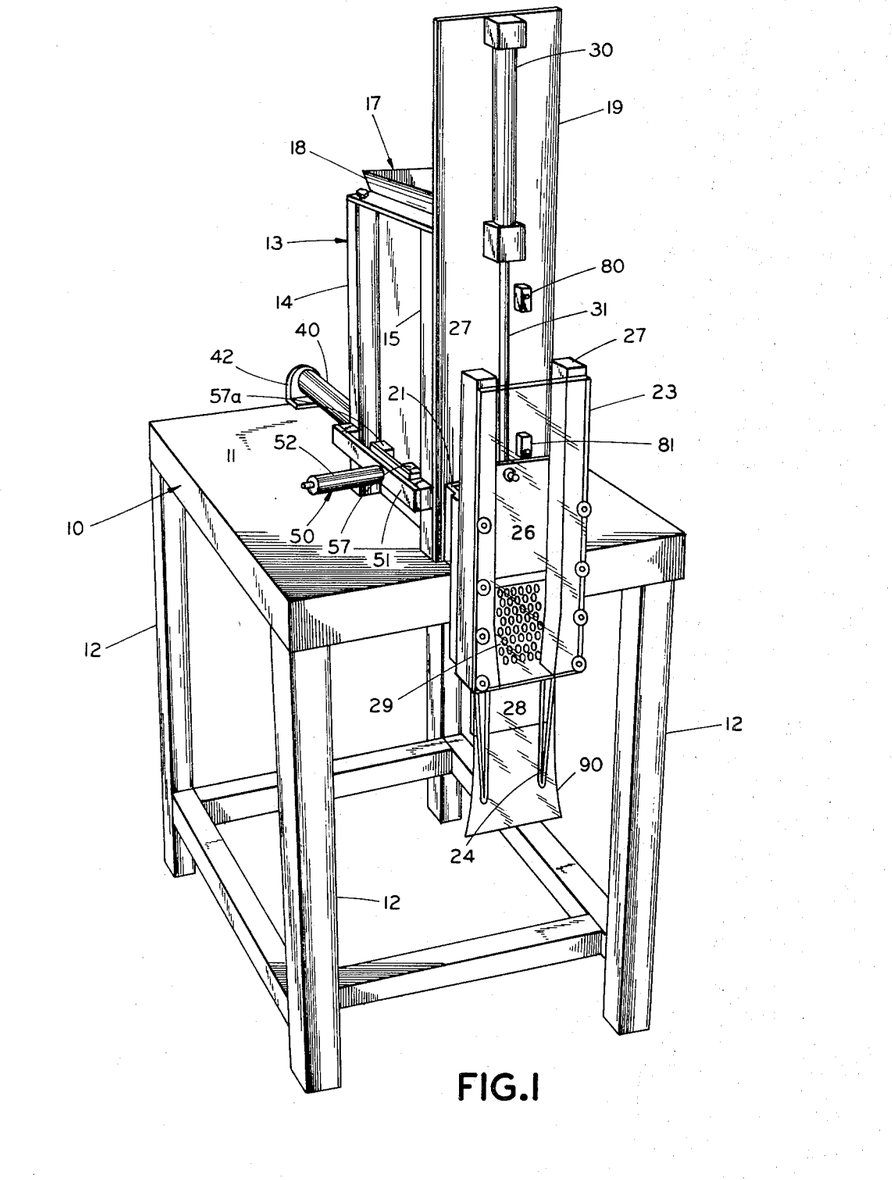
FIG. 1 is a perspective view in elevation of the machine taken from the front of the machine.
Figure 2:
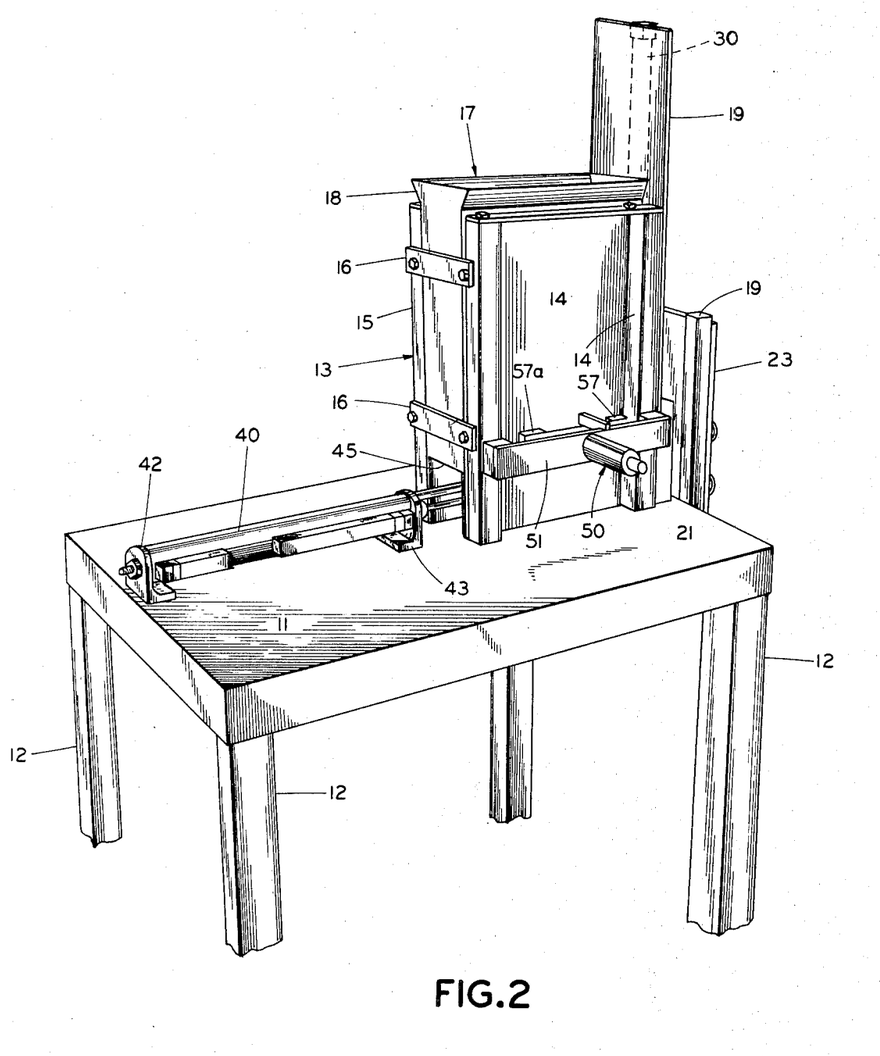
FIG. 2 is a perspective view in elevation taken from the side of the machine.
Figure 3:
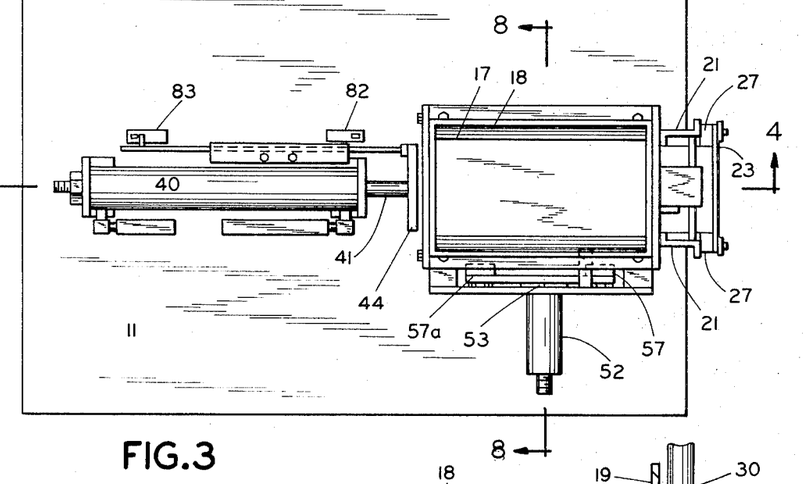
FIG. 3 is a plan view of the machine.
Figure 4:
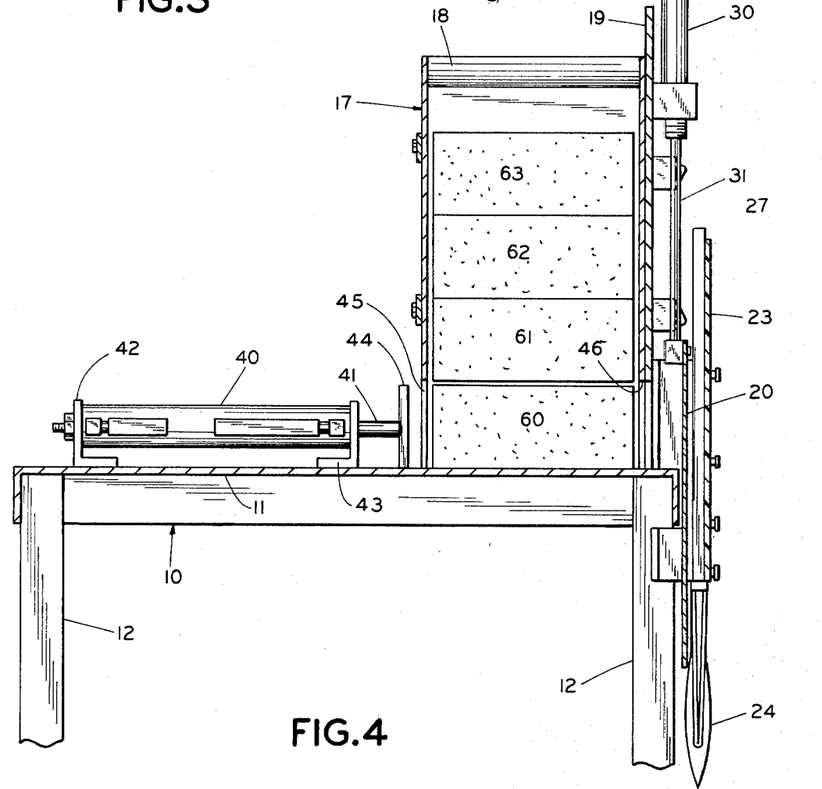
FIG. 4 is an elevational view partly in section taken along line 4—4 of FIG. 3.

As illustrated, the machine includes a table 10 having a top 11 and legs 12 (see FIGS. 1 and 2). Supported by the table is a hopper frame 13 formed by the side pieces 14 and 15 which are secured by end straps 16.

Inside the frame 13 is a hopper 17 enclosed about its sides and ends, open at its bottom and having the inclined edges 18 at its top to facilitate the introduction of cheese blocks thereinto and limiting the descent of the hopper within the frame. The hopper 17 is suitably of a size to receive the blocks of cheese of the size commonly available in commercial cheese operations. The hopper may be of a size to receive, for example, a stack of 4 blocks of cheese each having a dimension of about 4 × 4 × 12 inches, with a lower block resting on table top 11 and the other blocks each one above the other within the hopper.

At the front of hopper frame 13 is a frame plate 19, and mounted in spaced relation to plate 19 is a pair of upright guide members 27. These members provide on their iner edges vertical tracks which receive the edges of the shredding plate 20 so that the shredding plate moves up and down with its edges being guided in members 19. The mounting pieces 21 are provided for mounting the members 27 in a fixed spaced relation to plate 19.

Mounted on the front side of guide members 27 by means of screws 22 is a front plate 23 which may suitably be constructed of plexiglass or other transparent material.

Figure 5:
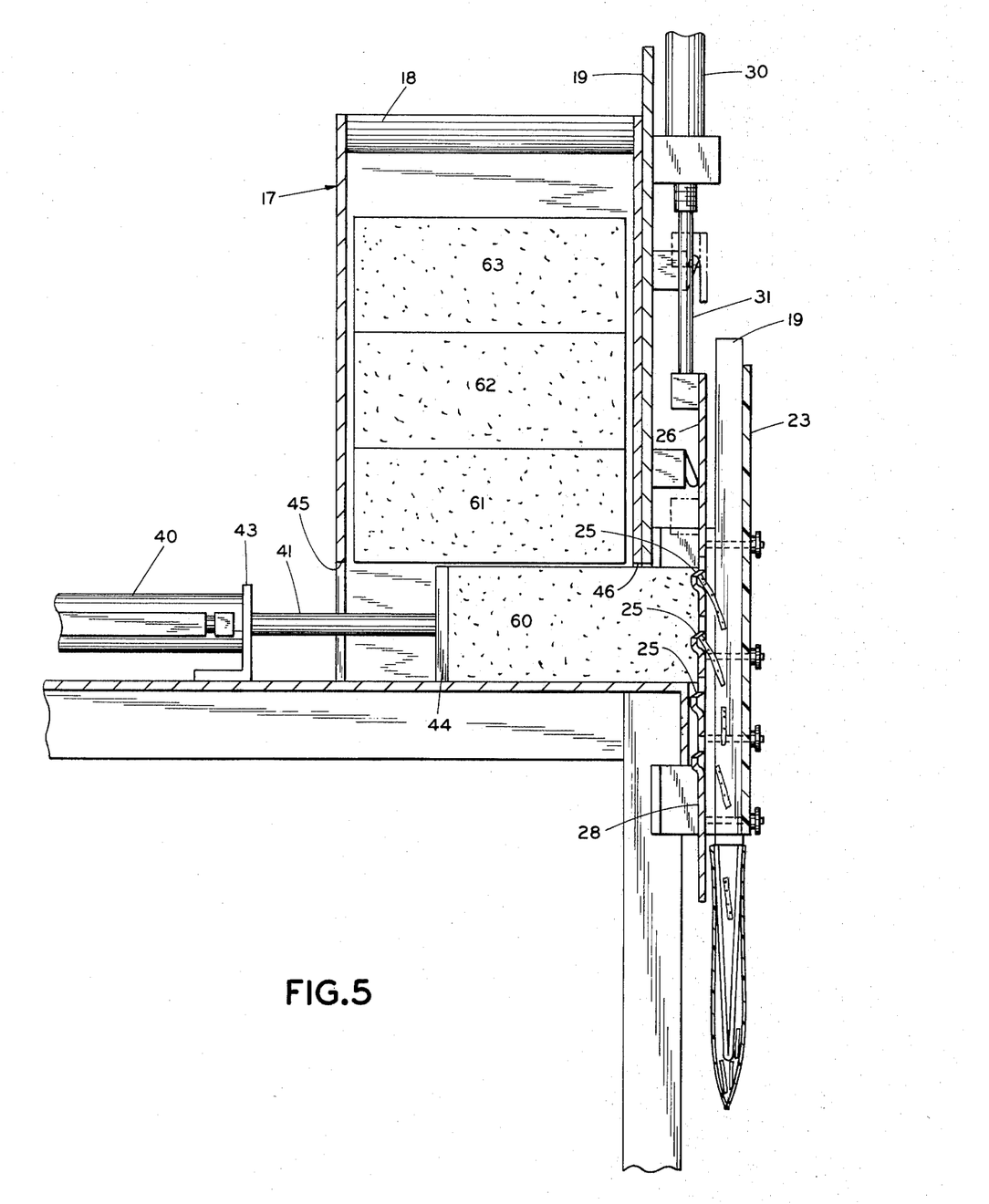
FIG. 5 is an enlarged sectional view similar to FIG. 4 but showing the shredding plate and its accompanying mechanism in enlarged form, also showing the shredded product as it comes from the shredding plate.

A pair of bag holding fingers 24 may depend from guide members 19 positioned so that a bag placed upwardly thereon may be held by frictional or spring tension in position to catch shreddings which fall downwardly after emerging from the front of the shredder plate 20. (See FIG. 5).

Figure 6:
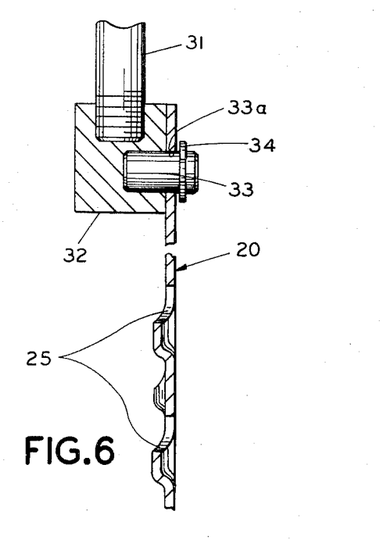
FIG. 6 is a detail sectional view showing in vertical cross section the connection between the shredder plate and the driving piston.
Figure 7:
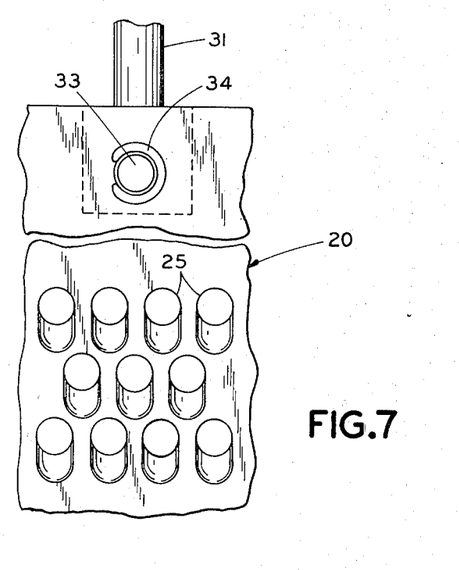
FIG. 7 is a view of the same connection as shown in FIG. 6 but showing a face view instead of a sectional view.
Figures 8, 9:
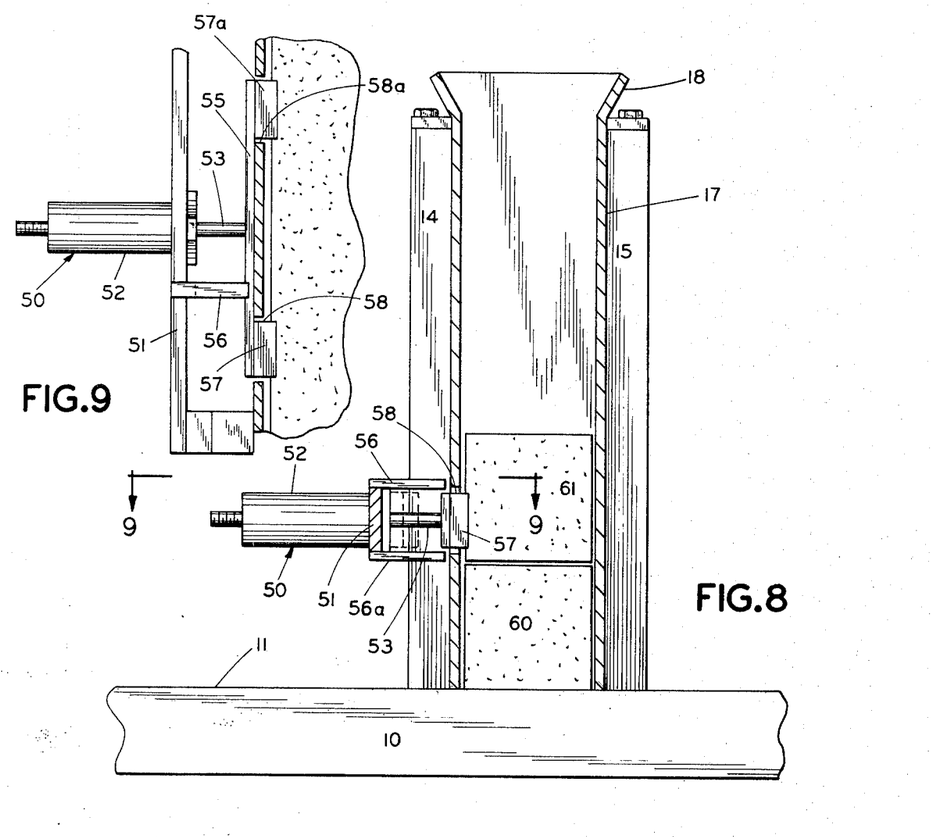
FIG. 8 is a detail sectional view taken along line 8—8 of FIG. 3.
FIG. 9 is a detail view partly in section taken along line 9—9 of FIG. 8 and showing the mechanism for holding the next higher block of cheese in a stack of cheese blocks.

Referring more particularly to the shredded plate 20, this plate, as previously explained, has its edges slideably engaged between guide members 27 and is vertically movable between these members. The central portion of this plate has the perforations 25 (see FIG. 6 and 7), the bottom edges of which are indented rearwardly so that these bottom edges of the perforations will act as knives to cut shreds of cheese from the cheese block when the plate is moved upwardly with these perforations bearing against a face of the cheese block within frame 13. An alternate structure could have the upper edges of the perforation indented in which case the plate would produce shreds of cheese as the plate is moved downwardly. The top portion 26 of the plate 20 is impervious and presents a smooth surface to the cheese block. Similarly, the lower portion 28 of plate 20 is impervious and presents a smooth surface to the cheese block.

By providing the smooth surfaces 26 and 28 the shredding plate is allowed to move up and down bringing the perforated center section completely across the cheese block without permitting the cheese to pass in front of the plate at either end of its reciprocating stroke.

The mechanism for driving the shredder plate includes a cylinder 30 mounted on frame plate 19 having a piston whose rod 31 is connected at its lower end to the top of the shredder bar. This connection is shown more particularly in FIGS. 6 and 7. As illustrated in these Figures, the rod 31 is in threaded engagement with the mounting block 32. The pin 33 extends forwardly of block 32 and through the hole 33a of the plate 20. A key 34 holds the plate in place and the arrangement provides an effective pivoted connection which avoids binding by the plate when moving vertically between guides 27.

The mechanism for pressing a cheese block forwardly in the lower part of hopper 17 and against the shredder plate 20 includes a fluid cylinder 40 and a piston having rod 41. This cylinder is held between the end mounting pieces 42 and 43 which are secured to table 10. The mounting is such that the rod 41 and its pusher foot 44 are lined up with the lengthwise dimension of the blocks within hopper 17. The hopper has a rear opening 45 and a front opening 46 so that when the piston of cylinder 40 is extended the foot 44 may move through opening 45 to push the lower block of cheese within the hopper forwardly with the front face of the cheese block being pressed against the shredder plate 20. Preferably the cylinder 40 is powered by a fluid such as air or other gas to provide a substantially constant pressure against the cheese but which does not demand forward movement at any certain rate.

Normally if the bottom block of a stack of cheese blocks were pushed from beneath the stack the upper blocks would fall down and interfere with the retraction of the pusher foot, and in order to prevent this I provide the mechanism 50 which will now be explained.

A frame bar 51 is mounted on the hopper frame 13. A fluid cylinder 52 is attached to bar 51 and has its piston rod 53 extending through an opening in bar 51 with its end secured in bar 55. Foot 55 is secured against rotation by the guides 56 and 56a which are attached to bar 51 and extend on each side of the foot 55.

Foot 55 has attached to it the foot members 57 and 57a which are positioned to extend through openings 58 and 58a in hopper 17 to contact not the lowermost of the cheese blocks within hopper but the next higher block which is adjacent to the lowermost block within the hopper. Contact by members 57 and 57a with this next higher block is effective to lock and hold this next higher block in its same elevation until the pushing mechanism has been completely retracted and out of the way so that upon releasing of this holding mechanism this next higher block may then fall down onto the table without interference with the pusher mechanism.

In the foregoing detailed description I have described the cheese hopper and frame, the mechanism including cylinder 30 and shredder plate 20 for shredding the cheese, the pusher mechanism including cylinder 40 for pushing a lower cheese block against the shredder plate, and the holding mechanism including the cylinder.

In general, the operation of the machine may be described as follows:

Blocks of cheese are placed in hopper 17 one on top of the other. As illustrated, four blocks are placed one on top of the other, block 60 being lowermost and blocks 61, 62, and 63 thereabove.

When the machine is being loaded with cheese blocks the piston of cylinder 40 is in retracted position in which the rod 41 and foot 44 are drawn rearward of hopper 17 and out of the way of the cheese block 60. Also the cylinder 52 has operated to withdraw its piston 53 and the foot members 57 and 58 so that these members do not interfere with the introduction of the cheese blocks into the hopper.

When the hopper has been loaded and a package 90 placed on holding fingers 24, the machine is started. Hydraulic fluid such as oil is supplied to cylinder 30 to drive the shredder plate in reciprocal motion, downwardly and upwardly. An upper limit switch 80 is provided which upon contact at the upper limit of the stroke to apply liquid behind the piston of cylinder 30 to send the shredder plate downwardly, and a lower limit switch 81 is provided which upon contact at the lower limit of the stroke reverses the flow of fluid to cylinder 30 to send the shredder plate upwardly. This reciprocal motion proceeds until interrupted by manual or automatic closure of the fluid pressure.

When the reciprocating shredding mechanism is placed into operation the cylinder 40 is also actuated to cause its foot 44 to contact and push forwardly against the rear end of the lowermost cheese block 60, and also the cylinder 52 is actuated to press the foot members 57 and 57a against the side of the cheese block 61. It will be observed that during the reciprocation of the shredding plate 20 the lower cheese block 60 is being pressed against this plate at a substantially constant pressure, and the reciprocating movement of the shredder plate operates to shred the cheese and allow the shreddings to fall into the bag 90.

I have found that when the cheese is pressed against the shredder plate with a substantially constant pressure each stroke of the shredder plate will shred a uniform and substantially constant amount of cheese from the cheese block, and by allowing the plate to reciprocate a predetermined number of times a predetermined amount of shredded cheese is placed in the package. Thus the fluid pressure to cylinder 30 may be interrupted when the shredder plate has reciprocated four times, for example, the package 90 then removed and another package put in its place; and this operation may be repeated to fill successive packages.

When the cheese block 60 has been expended and the piston rod 41 and foot member 44 contacts the limit switch 82 this reverses the air on cylinder 40 to retract the piston and foot member while the cheese block 61 is held in its same position and is prevented from falline while the piston and foot member are being retracted. When the cylinder 40 has operated to completely retract its piston and pusher foot 44 the switch 83 is struck which operates to reverse the air pressure on cylinder 52 causing the holding mechanism to release until the next block 61 has dropped and at the same time the air is reversed on cylinder 40 to cause the foot 44 to again advance and to press block 61 (now the lowermost block) against the shredder plate 20, so that further reciprocation of the shredder plate may continue with predetermined strokes for filling succeeding packages.

Figure 10:
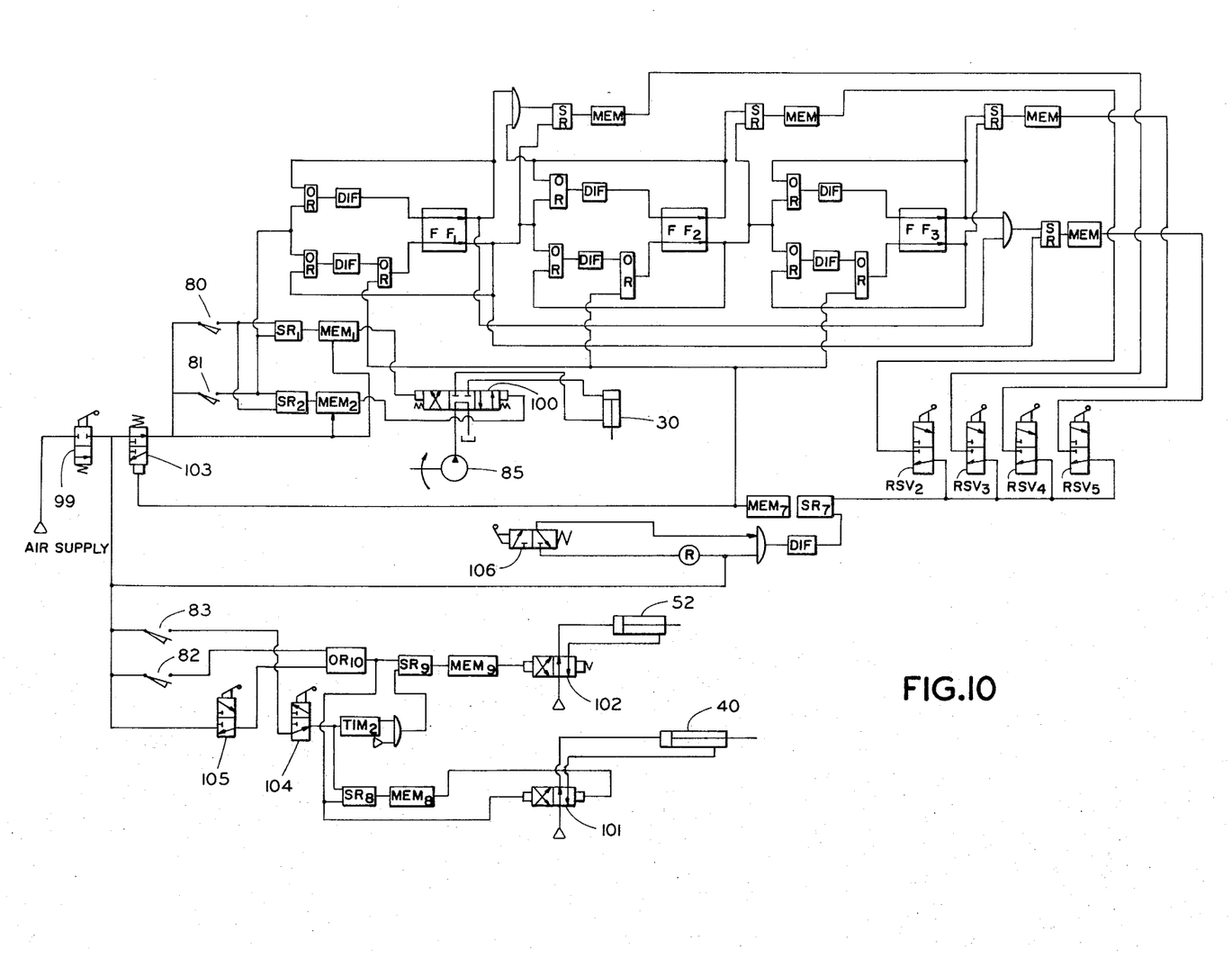
FIG. 10 is a diagram of the fluid and electrical circuits of the embodiment described herein.

In the foregoing explanation of the operation of my procedures I have contemplated that the operator would manually control the application of fluid to cylinder 30. In FIG. 10 I have illustrated an automatic system for controlling the fluid applied to cylinder 30 as well as the pushing cylinder 40 and the holding cylinder 52. FIG. 10 follows the Binary System of Logic and the terms given in this drawing are those used in this system. (See "Binary Logic" – Product Engineering – McGraw Hill Publishing Company, New York, N.Y. – 1963, and "Pneumatic Logic Controls" – Industrial Hydraulic Co. – Brookfield, Wis. – 1966.)

Referring particularly to FIG. 10, the cylinders 30, 40 and 52 are designated by the same characters as used in the other figures of the drawings. Valve 100 controls the air to cylinder 30, valve 101 controls the air to cylinder 40, and valve 102 controls the air to cylinder 52.

The air supply is indicated at the extreme left of the FIG. and the manual valve 99 controls the air supply to the system. Three other manual valves are shown, valve 103 controlling the air supply to the reciprocating mechanism, valve 104 controlling the air supply to the pushing mechanism, and valve 105 controlling the supply to the holding or locking mechanism.

Referring now to that part of FIG. 10 which illustrates the controls for th pushing cylinder 40, let us assume that the pusher foot 44 has retracted and made contact with the rear limit switch 83. This has put air through valve 99, switch 83 and valve 104, and through $SR_8$ and $MEM_8$ to move valve 101 so as to throw air on cylinder 40 to push foot 44 forwardly by a pressure measured by the pressure of the applied air supply. Once $MEM_8$ has been actuated the air supply is held in this connection until the reset of the $SR_8$ device has been actuated to release the connection.

When the pusher foot gets to its most forward position and the lowermost block of cheese has been shredded, the front limit switch 82 is contacted. When this occurs air pressure is passed through $OR_{10}$ to the reset of $SR_8$ thus releasing $MEM_8$ and putting pressure on the other side of valve 101 to drive the pusher foot 44 back to its retracted position.

Referring now to the control of the locking cylinder 52 as illustrated in FIG. 10, contact of the front limit valve 82 permits air to pass through $OR_{10}$ $SR_9$ and $MEM_9$ to maintain the holding mechanism in locked position – that is, with the piston and feet 57 and 57a extended to hold the cheese block from falling down. The $MEM_9$ device holds the connection in this position unitl upon complete retraction of the foot 44 the rear limit switch 83 is contacted, which passes air to the timer (designated $TIM_2$) and the reset of $SR_9$ to release the holding mechanism during the period of the timer. When the timer runs out the air pressure advances the piston of cylinder 52 and again locks the next higher cheese block in place. During the period of the timer, when the holding mechanism is released, the cheese block, which is held in its upper position only by the holding mechanism, is at this time allowed to fall down and thus be in position to be pushed forward by the next stroke of the pushing mechanism.

Turning now to the part of FIG. 10 which deals with the control of the shredding mechanism, the signal passes from the source through the on-off switch 99 and the spring pressed switch 103 and is applied against the upper limit switch 80 and the lower limit switch 81. As previously explained, these switches are operated by contact made when the piston of cylinder 30 reaches the upper limit of its stroke and the lower limit of its stroke respectively. Contact at the upper limit of the stroke permits the impulse to pass through switch 80 to set the device $SR_1$ start the $MEM_1$ and hold valve 100 in position to pass hydraulic fluid from pump 85 to cylinder 30 behind its piston so as to cause its piston rod 31 to be extended thus to move the shredding plate 20 in a downward direction.

$MEM_1$ serves to hold the valve 100 in this position after the contact at switch has been broken.

When the piston of cylinder 30 has moved downwardly to the end of its stroke it makes contact at switch 81. This operates to pass an impulse through to $SR_2$ thus to set this device and start the $MEM_2$, and at the same time to reset $SR_1$ to erase the signal at $MEM_1$, the effect of this being to shift valve 100 and so move the piston to cylinder 30 in the other direction. Similarly, when contact is again made at the upper switch 80 the movement of the shredder plate is again reversed and moved downwardly again.

Reciprocation of the shredder plate 20 thus proceeds until it is interrupted. If there were no further control of the reciprocating mechanism the shredder plate 20 would simply continue in its reciprocating movement. However, since it is desired to fill a package of shredded cheese using a predetermined number of strokes of the shredder plate, I provide a means for counting the strokes and stopping this reciprocation after a selected number of strokes has taken place.

The counting means includes a series of flip-flop devices indicated in FIG. 10 by the characters $F-F_1$, F-Fhd 2, and $F-F_33$, and rotary selector valves $RSV_2$, $RSV_3$, $RSV_4$, $RSV_5$. Flip-flop switch $F-F_1$, together with its surrounding circuitry constitutes one counting unit and $F-F_2$ and $F-F_3$ with their surrounding circuitry constitute additional counting units.

If, for example, it is determined that three passes of the shredder plate across the cheese block should be made to fill an individual package, the operator turns $RSV_3$ to operative position and the signal is passed through $RSV_3$ on the third stroke of the shredder plate which interrupts the reciprocating movement of this plate until the filled package can be removed and an empty bag put in its place.

To review the interrupting function, we may note at the upper portion of FIG. 10 that when the shredder plate reaches the limit of its down stroke and switch 80 is contacted an impulse is transmitted to $F-F_1$, and upon the second down stroke an impulse is transmitted to $F-F_2$. The signal of $F-F_1$ and $F-F_2$ is added and presented to $RSV_2$, but this still produces no result because $RSV_2$ has not been turned to actuating position. However, on the third stroke when the signal at $F-F_1$, $F-F_2$ and $F-F_3$ is added and presented at $RSV_3$ this switch being actuated passes the signal through $SR_7$ and $MEM_7$ to switch 103, thus stopping the reciprocating shredding movement of plate 20. This interrupted condition is maintained until $MEM_7$ is erased by some means. As shown in FIG. 10, I provide a manual control valve 106 which when actuated by the operator resets $SR_7$ to erase $MEM_7$ thus allowing spring pressed valve 103 to return to its former position in which it passes impulses.

The above operation to interrupt the reciprocation of the shredding plate at the third stroke can be varied at the will of the operator by simply turning $RS_2$ or other of the rotary selector valves to receive the signal, as one may desire two or some other number of strokes in the filling of a package.

Also the counting mechanism may be connected to operate with contact at the up end of the stroke instead of the down end of the stroke as above described. This may be accomplished by shifting its connection from limit switch 81 to limit switch 80. As a practical matter I find that there is some over run of the reciprocating shredding mechanism and if this over run amounts to a full stroke it may be well to set the mechanism for interruption of the air at the end of the up stroke intending that the shredder plate will be in its down position when it comes to rest.

While this invention has been described in detail and exemplified only in terms of its preferred embodiment, those skilled in the art will appreciate that many variations and modifications may be made within the skill of the art and without departing from the spirit and scope of the invention.

I claim:

1. Apparatus for shredding blocks of cheese comprising a table, a frame mounted on said table, a hopper within said frame and open at its bottom, said hopper being adapted to receive blocks of cheese in stacked relationship the lowermost of said blocks resting on said table, a perforated shredder plate having an edge of said perforations turned inwardly toward said cheese blocks to provide cutting edges, means for mounting said plate for reciprocating movement within said frame to move said shredder plate across the surface of the lower-most of said blocks of cheese, and means for pushing said lowermost block against said shredder plate while said plate is in reciprocal motion.

2. Apparatus as set forth in claim 1 including hydraulic means for driving said plate in reciprocal motion and including fluid driving means for pushing said lowermost block.

3. Apparatus for shredding a block of cheese comprising a perforated shredding plate the perforations of said plate having one edge turned inwardly toward said block to provide cutting edges, fluid powered means including a fluid cylinder and a piston for driving said plate in reciprocating motion, and fluid powered means including a cylinder and piston for pressing said block against said plate while said plate is in reciprocating motion whereby to shred cheese from said block.

4. Apparatus for shredding cheese comprising means for supporting a block of cheese, a perforated shredding plate, means for driving said shredding plate in reciprocal motion to pass said plate in contact with and across a face of said block, and means for applying pressure against said block to press the same against said plate, said driving means including a fluid cylinder and piston and including a switch which operates to apply fluid in one direction against said piston when said piston approaches one end of its stroke and a second switch which operates to apply fluid in the other direction against said piston when the piston approaches the other end of said stroke whereby said piston is driven in reciprocating motion during operation of said switches and during applicaiton of said fluid under pressure.

5. Apparatus as set forth in claim 4 including fluid operated means for interrupting said reciprocal motion when said plate has been driven a predetermined number of strokes.

6. Apparatus as set forth in claim 5 wherein said last-mentioned means is sensitive to repeated strokes of said piston and is operative to interrupt said reciprocal motion when a predetermined number of strokes have been sensed.

7. Apparatus as set forth in claim 4 wherein said means for applying pressure against said block includes a fluid cylinder and a piston and including means sensitive to the position of said last-mentioned piston for retracting said last-mentioned piston when said last-mentioned piston has reached the forward end of its stroke.

8. Apparatus as set forth in claim 7 including means for reversing the movement of said last-mentioned piston to a forward direction when said last-mentioned piston has been retracted to a predetermined position.

9. Apparatus as set forth in claim 7 where a plurality of cheese blocks are stacked one on top of the other and wherein said pressing means is operative to press the lowermost of said stack of cheese blocks against said plate and including means for permitting a next higher block of cheese within said stack to drop into position to be acted upon by said pressing means after said lowermost block has been shredded.

10. Apparatus as set forth in claim 9 including means for holding said next higher block in its original position during the retraction of said pressing means.

11. Apparatus as set forth in claim 10 wherein said holding means includes a fluid cylinder and a piston, and means for applying fluid to said cylinder for advancing said piston to thereby lock said higher block of cheese against vertical movement until retraction of said pressing means has been completed.

* * * * *